United States Patent [19]

Whritenour

[11] Patent Number: 4,631,852

[45] Date of Patent: Dec. 30, 1986

[54] DEVICE FOR CASTING A FISHING LURE

[76] Inventor: Edward Whritenour, 2611 River Rd., Manasquan, N.J. 08736

[21] Appl. No.: 850,546

[22] Filed: Apr. 11, 1986

[51] Int. Cl.⁴ .............................................. A01K 91/02
[52] U.S. Cl. ....................................................... 43/19
[58] Field of Search ...................... 43/19, 25; 446/212, 446/429

[56] References Cited

U.S. PATENT DOCUMENTS 3,255,548  6/1966  Whritenour ............................ 43/19
3,468,051  9/1969  Duperron ............................... 43/19

Primary Examiner—Nicholas P. Godici
Assistant Examiner—Karen Skillman
Attorney, Agent, or Firm—Clifford G. Frayne

[57] ABSTRACT

An improved missile tube for a rocket propelled fishing device powered by a blank cartridge and a rocket motor, the improved missile tube containing a plurality of pivotably mounted clip tabs securing the fishing line, fishing leader and fishing hook to the missile tube in streamlined position during flight, the pivotably mounted clip tabs, rotating after ejection of the rocket motor to permit the fishing line, fishing leader and fishing hook to detach from the pivotably mounted clip tabs and fall into the water, the missile tube itself serving as the sinker for the fishing line, fishing leader and fishing hook.

6 Claims, 5 Drawing Figures

DEVICE FOR CASTING A FISHING LURE

FIELD OF INVENTION

This invention relates to an improved device for casting or propelling a fishing lure attached to a fishing line.

BACKGROUND OF THE INVENTION

The problems of accurately casting a lure or baited fishing hook for any distance are well-known. In hand-casting, not only does it take a high degree of skill to make an accurate cast and a considerable amount of space around the fisherman for clearance of his pole and the line, but the maximum distance, which even the most skilled fisherman can cast, is rather limited. In surf fishing, it is frequently impossible for the fisherman to cast sufficiently far to reach the location offshore where the fish are located unless a pier is available.

Mechanical casting devices of various types have been proposed in which the fishing lure is propelled by a catapult or gun integral with or replacing the fishing pole. These types cast the lures by means of springs, compressed gases or the like. Applicant is the holder of U.S. Pat. No. 3,255,548 for a device and method for casting a fishing lure. The object of applicant's invention in U.S. Pat. No. 3,255,548 was to provide a device and method for propelling a fishing lure an extended distance and which device would impose little reactionary force on the operator or the fishing pole.

Applicant's device as disclosed in U.S. Pat. No. 3,255,548 has been successful, however, applicant has made an improvement to the device as disclosed in U.S. Pat. No. 3,255,548 which provides it with greater stability and incorporates the leader and hook of the line, with the device to provide greater stability in flight and hence, a greater distance and accuracy in casting.

OBJECTS OF THE INVENTION

An object of this invention is to provide an improved device for propelling a fishing lure for extended distances.

Another object of the invention is to produce an improved device for propelling a fishing lure extended distances with accuracy and stability in flight which will easily release the hook and leader.

SUMMARY OF THE INVENTION

These objects and others are attained in improvement to the disclosure in U.S. Pat. No. 3,255,548 by utilizing a hollow tube, open at one end only, into which a solid propellant rocket motor, readily available on a commercial market, is inserted. The hollow propulsion tube, which is referred to as the missile, is attached to the fishing line by improved rotatable clip tabs and is adapted to act as a barbed lure or a carrier for a leader and baited hook. The missile may be detachably fitted into the end of the barrel of the launcher which comprises a short barrel at the end of the simple breech mechanism. A small caliber blank cartridge, preferably at .22-caliber cartridge is inserted into the breech mechanism and fired. The hot gases from the cartridge simultaneously blow the hollow missile tube and contained rocket from the end of the launcher barrel to initiate the flight path and concurrently ignite the propellant of the rocket motor upon passing through the nozzle of the rear of the rocket motor which is facing into the launcher barrel when the propulsion tube is attached to the launcher. The ignited rocket motor then propels the missile along an extended flight path, at the end of which an explosive charge in the front end of the rocket motor is ignited to expel the motor rearwardly through the open end of the missile tube. The empty missile tube, continues along a falling trajectory, the falling trajectory, together with the expulsion of the rocket motor, causes the improved rotatable clip tabs on the missile tube, to rotate thus releasing the leader and baited hook.

BRIEF DESCRIPTION OF DRAWINGS

A better understanding of the present invention as well as other objects and advantages thereof, will become apparent upon consideration of the detailed disclosure thereof, especially when taken with the accompanying drawings wherein.

DETAILED DESCRIPTION OF DRAWINGS

Figure 1:
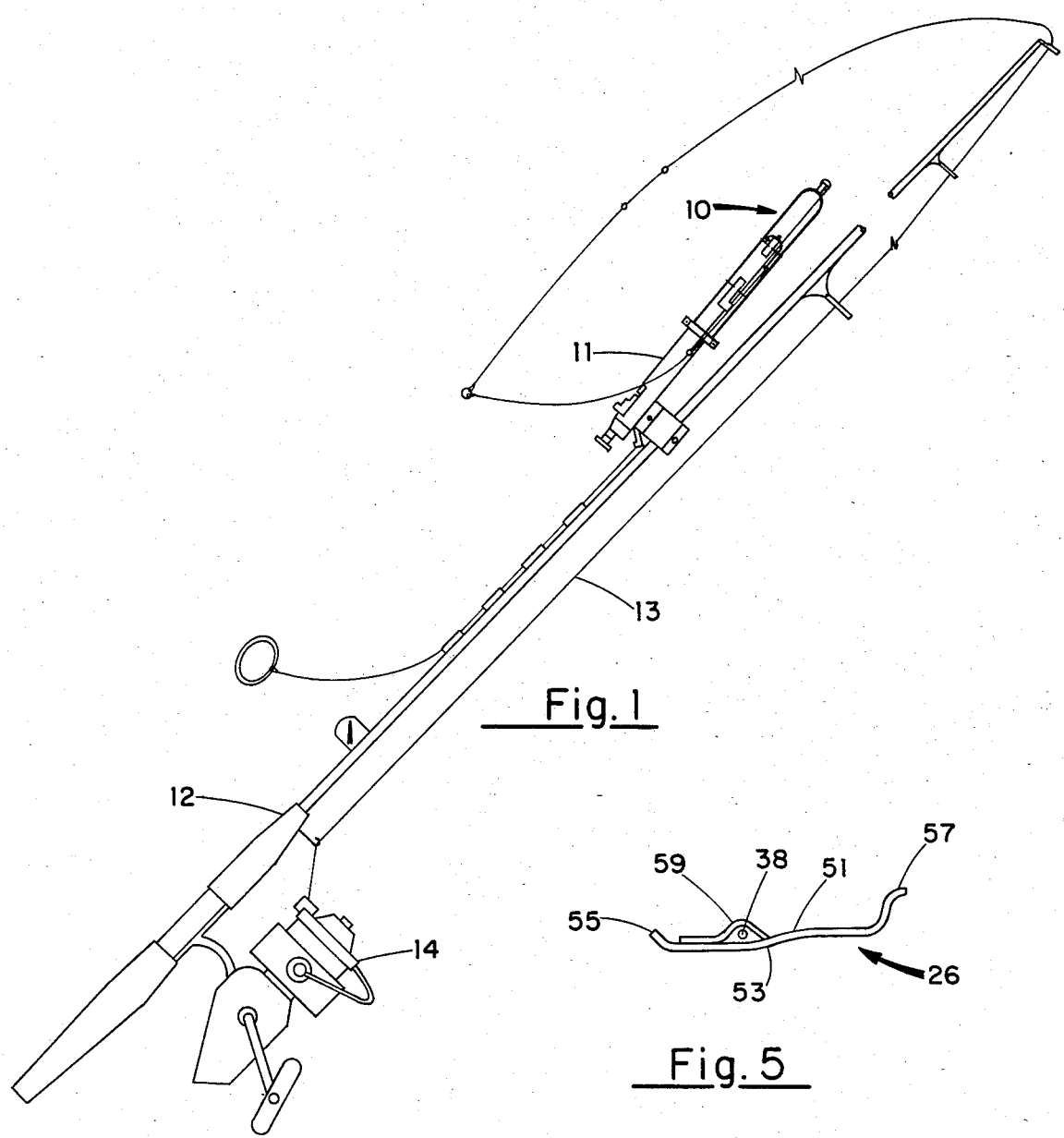
FIG. 1 is a side view of the device attached to a fishing rod.

FIG. 1 shows the rocket propelled missile tube 10 detachably connected on the front end of a missile launcher 11 which in turn is clamped onto a fishing rod 12 having a conventional reel 14 and fishing line 13, the end of which is attached to the propulsion tube 10. The component parts of the missile launcher are described in detail in U.S. Pat. No. 3,255,548 and are not affected by the improvements to missile tube 10.

Figure 2:
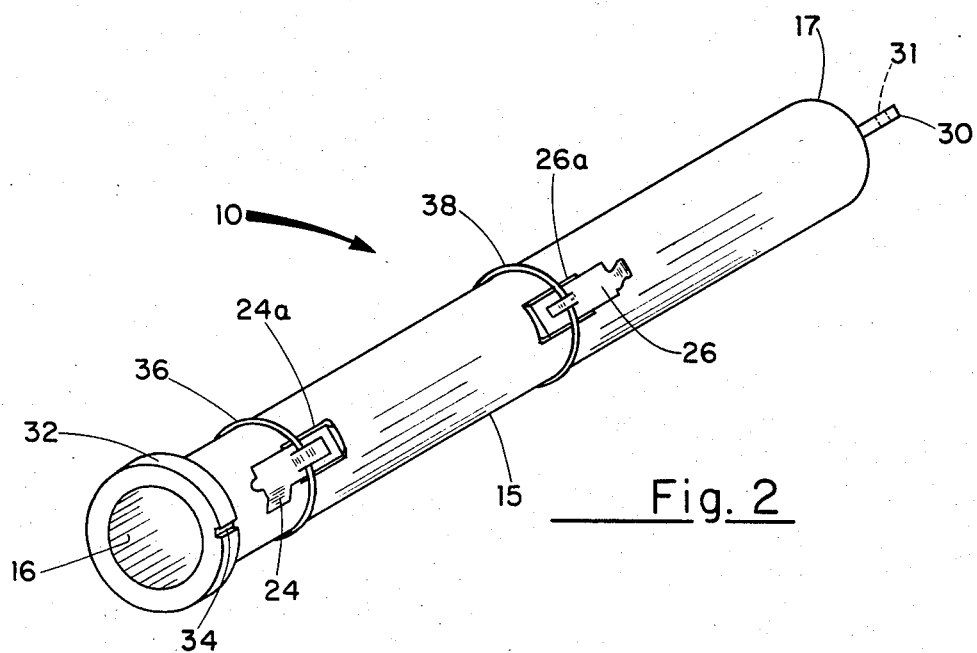
FIG. 2 is a side view perspective of the missile tube.
Figure 3:
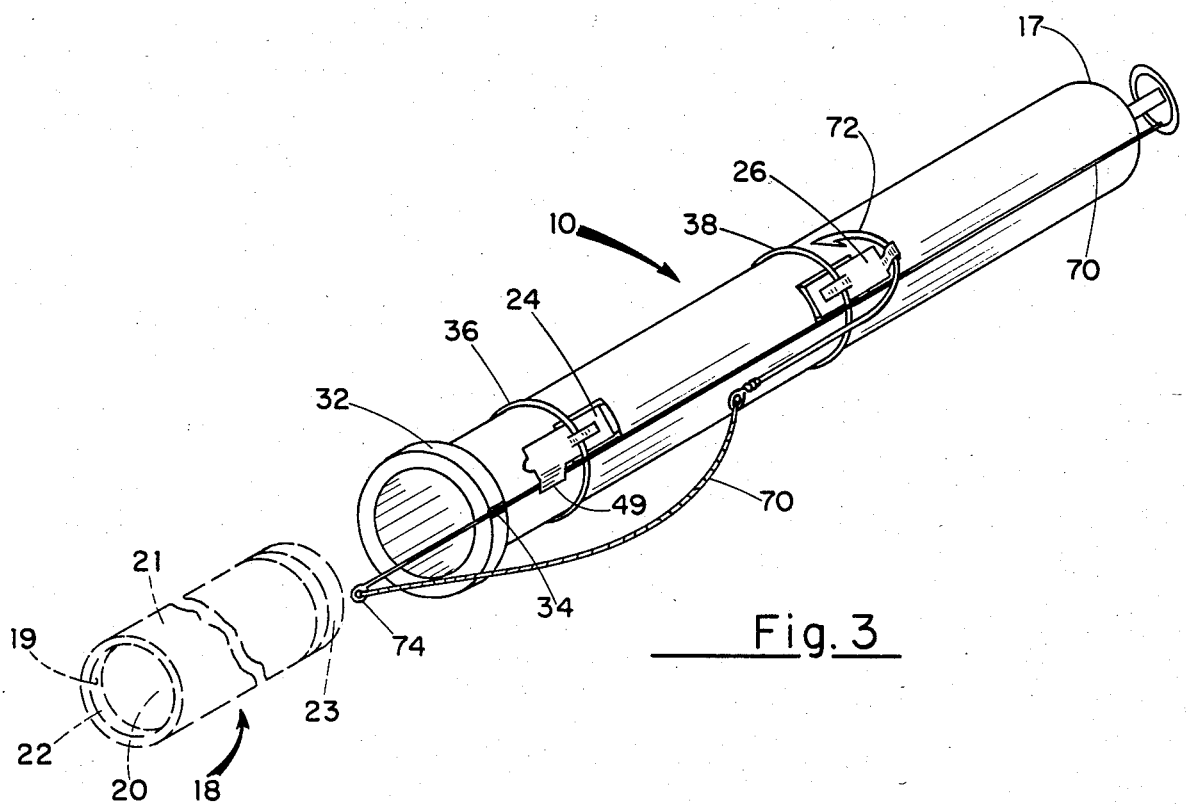
FIG. 3 is a side perspective view of the missile tube and propelling rocket motor at the end of its powered flight when the missile is configured as a baited hook carrier and sinker.

Referring to FIGS. 2 and 3, the propelled unit, referred to as the missile or missile tube 10, is a hollow cylindrical tube 15 having an opened rear end 16 and a closed front end 17 which is tapered to present a moderately streamlined contour. The missile interior is of such a diameter and length as to hold a rocket motor 18 inserted into the tube so that the rear of the motor, nozzle 19, faces to the rear of the open end 16 of missile tube 10. The rocket motor 18, as shown in the ejection phase in FIG. 3, is a solid propellant type, toy propellant rocket. One rocket motor, which has been utilized successfully is super type B-6 toy rocket motor manufactured by Model Missiles, Incorporated of Denver, Colorado. This rocket has the usual solid powder propellant 20 packed inside the casing 21 with a nozzle opening 19 and the rear plug 22. The rocket has an explosive charge 23 at the front end which is ignited when the combustion of the propellant charge reaches this point. The explosive charge expels the rocket motor out of the opened rear end 16 of the missile tube as indicated in FIG. 3 when the missile reaches the end of its powered flight path.

Rocket motor 18, when inserted into missile tube 10, cooperates with rotatable clip tabs 24 and 26 to secure the hook, leader and bait to missile tube 10 as more fully described hereafter. The expulsion of rocket motor 18 from missile tube 10 activates rotatable clip tabs 24 and 26 for the release of the leader, hook and bait in missile tube 10 hereafter missile tube 10 operates as the weighted sinker for the leader, hook and bait as will be more fully described hereafter.

Referring now specifically to FIG. 3, there is shown missile tube 10 which is a substantially hollow cylindrical tube 15 having an open rear end 16 and a closed front end 17 which is contoured to reduce wind resistance. Secured to contoured front end 17 is an eye piece 30 having an opening 31 therethrough, for securing the leader and hook.

There is cut into the sides of hollow cylindrical tube 15, two rectangular openings, 24a and 26a which openings are in longitudinal alignment along missile tube 10.

Open rear end 16 of missile tube 10 contains an outwardly extending flange 32, perpendicular to the longitudinal axis of missile tube 10, flange 32 having an indent 34 contained therein, which is in substantial alignment with openings 24a and 26a.

Clip tabs 24 and 26 are maintained in position on openings 24a and 26a, by means of circumferential metal bands 36 and 38 which encircle missile tube 10 and are secured to missile tube 10 by means of a solder point. Clip tabs 24 and 26 are substantially identical in cross sectional area to openings 24a and 26a.

Figure 5:
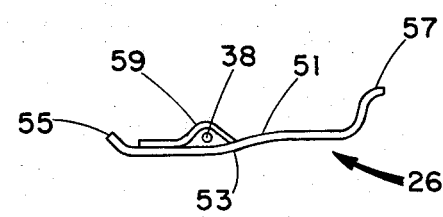
FIGS. 4 and 5 are side blow-up views of the clip tabs which are the subject matter of the present invention.
Figure 4:
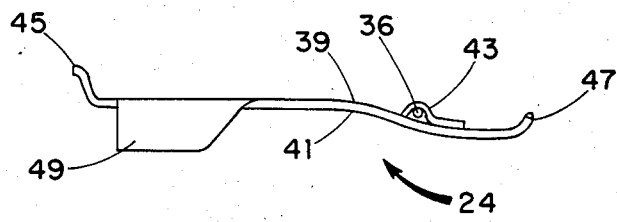

Referring to FIGS. 4 and 5, there is shown, sectional blow-up views of clip tabs 24 and 26.

Referring to FIG. 4, clip tab 24 is comprised of an upper curved surface 39 and a lower curve surface 41. Clip tab 24 has defined on upper curved surface 39 and eyelet opening 43 for passage therethrough of circumferential band 36. Upper curved surface 39 is curved upwardly at ends 45 and 47 of clip tab 24 and there is, depending downwardly from lower curved surface 41, proximate to end 45, a flange 49 for engagement with the leader as set forth hereafter. Clip tab 24 is designed such that it is rotatable about circumferential band 36 such that end 47 of clip tab 24 can rotate downwardly through opening 24a into the interior of missile tube 10 when rocket motor 18 has been expelled. End 45 of clip tab 24 is halted in its downward movement by contact with the outer surface of missile tube 10.

Referring to clip tab 26 in FIG. 5, it can be seen that it is designed as much the same as clip tab 24 with the exception of the fact that it is smaller in size. Clip tab 26 contains an upper curved surface 51 and a lower curved surface 53 and a first end 55 and a second end 57. Ends 55 and 57 are turned upwardly from upper curved surface 51. Clip tab 26 also contains an eyelet opening 59 for passage therethrough of circumferential band 38.

When positioned on missile tube 10, clip tab 26 is designed such that end 55 is rotatable downwardly into the interior of missile tube 10 when rocket motor 18 is expelled and end 57 is halted in its rotation by contact with the outer surface of missile tube 10. FIGS. 6 and 7 show top views of clip tabs 24 and 26.

As will be discussed hereafter, the design of clip tabs 24 and 26 comprise the improvement with respect to applicant's lure launcher and provide for an easier and more assured release of the leader, hook and bait while, at the same time, holding the leader, hook and bait in a more streamlined position during the flight of missile tube 10.

Referring to FIG. 3, there is shown missile tube 10 together with leader 70 and hook 72 affixed thereto. In operation, when the rocket motor 18 is secured within the hollow cavity of cylinder 15, clip tabs 24 and 26 are in the horizontal position such that ends 47 and 55, respectively, cannot depend into the interior of cylinder 15. Clip tabs 24 and 26 are held in this position by rocker motor 18 which is substantially identical in cross sectional area to the interior of missile tube 10 thereby causing clip tabs 24 and 26 to remain in a substantially horizontal position with relationship to the outer surface of missile tube 10.

In this configuration, the leader 70 is secured through opening 31 in eyelet 30 at the conical forward portion 17 of missile tube 10. The leader which is normally of a light metallic composition extends along missile tube 10 and is secured under clip tab 24 by depending flange 49. The leader continues rearwardly along missile tube 10 and passes through indent 34 and circumferential flange 32 at the rearward portion of missile tube 10. This first length of leader 70 ends in an eyelet 74 and a second length of leader 70 extends from eyelet 74 to hook 72. Hook 72 is secured under clip tab 26 by placing the hook under end 57 of clip tab 26. Hook 72 is secured in this position when the rocket motor 18 is contained within missile tube 10. A standard fishing line 75 is secured to eyelet 74 and is secured to reel 14.

In operation, once flight has been initiated, and the propellant 20 of rocket motor 18 has been expended, rocket motor 18 is jetisoned rearwardly through opening 16 of missile tube 10. In this configuration, there is no longer a rocket motor within missile tube 10 to secure clip tabs 25 and 26 in a substantially horizontal position coinciding with sidewall of missile tube 10. Clip tabs 24 and 26 are then free to rotate about circumferential bands 36 and 38 respectively. At the apex of the flight, clip tabs 24 and 26, now freely rotatable, will rotate such that ends 47 and 55 respectively of clip tabs 24 and 26 rotate inwardly into the cavity of missile tube 10. Such rotation causes the release of hook 72 from upper end 57 of tab 26 and the release of leader 70 from the downwardly depending flange 49 of clip tab 24. As such, the leader falls free of the missile tube and falls into the water whereby the missile tube 10 serves as the weighted sinker for leader 70, hook 72 and any bait which may be attached thereto.

This rotatability of clip tabs 24 and 26 provides an improved method for securing leader 70 and hook 72 to the missile tube and insuring their accurate and unfettered release at the apex of the flight. Further, the design of clip tabls 24 and 26 in combination with indent 34 on annular flange 32 of missile tube 10 provides an improved method of maintaining the leader 70 and hook 72 in a streamlined position during the flight of missile tube 10 such that there is a reduced possibility for entanglement of the leader and line and a more streamlined configuration is presented in order to reduce wind resistance.

It will be recognized by one skilled in the art that if one wishes to use a longer leader or a leader of a different material, that the leader and hook may be affixed to rotatable clip tabs 24 and 26 by winding this extended leader around rotatable clip tabs 24 and 26 in order to provide a more streamlined configuration and reduce wind resistance. Rotatable clip tabs 24 and 26 will operate in the same fashion releasing this extended wire leader before entering the water.

While the above matter describes and illustrates preferred methods and embodiments of the invention, it should be understood that the invention is not restricted solely to the described method and embodiments, but that it covers all modifications which should be apparent to one skilled in the art which would fall within the scope and spirit of the invention.

I claim:

1. An improved rocket propelled fishing device having a hollow missile tube having a tapered, closed front end section, a hollow tubular middle section constituting a substantial length of said missile and of a size to contain a rocket motor inserted therein, and an open rear end section extending rearwardly of said middle section, a breech mechanism having a short barrel and including means for loading and firing a blank cartridge into the bore of said barrel, said barrel having its outer surfaces contoured to snugly fit inside said rear end section of the missile tube and hold said tube axially aligned with said bore whereby the firing of the blank cartridge into said bore forces said tube from the end of said barrel and ignites the rocket motor which propels said tube along an extended flight pattern, said missile tube having a means for attaching a fishing line leader and line proximate to said tapered, closed front end section, wherein the improvement comprises:

(a) a plurality of pivotly mounted clip tabs mounted on said hollow tubular middle section of said missile tube, said clip tabs pivotable between extended and retracted position, said clip tabs in said retracted position, lying closely adjacent to the exterior surface of said tube, said clip tab in said extended position projecting substantially perpendicular to said axis of said missile tube, said clip tab maintained in said retracted position by said rocket motor positioned within said middle section of said missile tube and said clip tab positioned in said extended position after ejection of said rocket motor, (b) an annular flange positioned proximate to said open end section of said missile tube, said annular flange having a longitudinal indent therethrough in substantial alignment with said plurality of clip tabs for engaging said fishing leader, (c) means for releasably mounting at least one fish hook and leader on said pivotably mounted clip tabs in cooperation with said longitudinal indent.

2. An apparatus in accordance with claim 1 wherein said pivotably mounted clip tabs are curvilinear having an eyelet therethrough for rotatably securing said pivotably mounted clip tabs on said missile tube.

3. An apparatus in accordance with claim 1 wherein said pivotably mounted clip tabs include at least one pivotably mounted clip tab proximate to said open rear end of said missile tube, said povitably mounted clip tab having a depending flange engaging said fishing leader.

4. A missile tube for a rocket propelled fishing device said missile tube having a tapered, closed front end section, a hollow tubular middle section constituting a substantial length of said missile and of a size to contain a rocket motor inserted therein, an opened rear end section extending rearwardly from said middle section, a plurality of pivotably mounted clip tabs mounted on said hollow tubular middle section of said missile tube, said clip tabs pivotable between extended and retracted position, said clip tabs in said retracted position, lying closely adjacent to the exterior surface of said tube, said clip tabs in said extended position projecting substantially perpendicular to the axis of said missile tube, said clip tab maintained in said retracted position by said rocket motor positioned within said middle section of said missile tube and said clip tab positioned in said extended position after rejection of said rocket motor, an annular flange positioned proximate to said open end section of said missile tube, said annular flange having a longitudinal indent therethrough in substantial alignment with said plurality of clip tabs for engaging fishing leader, means for releasably attaching at least one fish hook, fishing leader and fishing line on said pivotably mounted clip tabs in cooperation with said pivotably mounted clip tabs and said longitudinal indent.

5. An apparatus in accordance with claim 4 wherein said pivotably mounted clip tabs are curvilinear having an eyelet therethrough for rotatably securing said pivotably mounted clip tabs on said missile tube.

6. An apparatus in accordance with claim 4 wherein said pivotably mounted clip tabs include at least one pivotably mounted clip tab proximate to said open rear end of said missile tube, said pivotably mounted clip tab having a depending flange engaging said fishing leader.

* * * * *